US012507901B2

(12) United States Patent
Lee et al.

(10) Patent No.: US 12,507,901 B2
(45) Date of Patent: Dec. 30, 2025

(54) INTEGRATED FLEXIBLE SENSOR FOR BLOOD PRESSURE MEASUREMENTS

(71) Applicant: Apple Inc., Cupertino, CA (US)

(72) Inventors: Joseph R. Lee, Belmont, CA (US); Joseph M. Schmitt, Cupertino, CA (US); Derek Young, Fremont, CA (US); Pranay Jain, Cambridge, MA (US); Ali M. Amin, Cupertino, CA (US); Wegene Tadele, San Francisco, CA (US); Zijing Zeng, San Jose, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 16/928,933

(22) Filed: Jul. 14, 2020

(65) Prior Publication Data

US 2022/0015652 A1    Jan. 20, 2022

(51) Int. Cl.
*A61B 5/022*    (2006.01)
*A61B 5/00*    (2006.01)

(52) U.S. Cl.
CPC .......... *A61B 5/02233* (2013.01); *A61B 5/721* (2013.01); *A61B 5/7246* (2013.01); *A61B 5/02208* (2013.01); *A61B 2562/0247* (2013.01)

(58) Field of Classification Search
CPC ... A61B 5/02233; A61B 5/721; A61B 5/7246; A61B 5/02208; A61B 5/725;
(Continued)

(56) References Cited

U.S. PATENT DOCUMENTS

| 4,005,701 A | 2/1977 | Aisenberg et al. |
| 4,290,434 A | 9/1981 | Jewett |

(Continued)

FOREIGN PATENT DOCUMENTS

| CN | 103598879 | 2/2014 |
| CN | 104545892 | 4/2015 |

(Continued)

OTHER PUBLICATIONS

U.S. Appl. No. 16/998,902, filed Aug. 20, 2020, Tadele et al.
(Continued)

*Primary Examiner* — Alex M Valvis
*Assistant Examiner* — Anna Roberts
(74) *Attorney, Agent, or Firm* — Brownstein Hyatt Farber Schreck, LLP

(57) ABSTRACT

Embodiments are directed to a blood pressure measurement device including a cuff that is operative to wrap around a limb of a user, a bladder coupled to the cuff and operative to compress the limb of the user when inflated, and a piezoelectric sensor coupled to the cuff and operative to detect blood flow through the limb of the user and output a signal indicative of the blood flow. The blood pressure measurement device can also include a processor coupled with the piezoelectric sensor that is operative to filter the signal to isolate sounds corresponding to changes in the blood flow through the limb due to inflation of the bladder, correlate the isolated sounds with a pressure inside the bladder, and determine a blood pressure of the user at least partially based on correlating the isolated sounds with the pressure.

19 Claims, 8 Drawing Sheets

(58) Field of Classification Search
CPC . A61B 5/0261; A61B 5/0225; A61B 5/02141; A61B 5/6824; A61B 5/72; A61B 2562/0247; A61B 2562/0204
See application file for complete search history.

(56) References Cited

U.S. PATENT DOCUMENTS

| | | | |
|---|---|---|---|
| 4,548,198 | A | 10/1985 | Manes |
| 4,896,676 | A | 1/1990 | Sasaki |
| 5,135,003 | A * | 8/1992 | Souma ............... A61B 5/02156 600/495 |
| 5,494,043 | A * | 2/1996 | O'Sullivan ........ A61B 5/02208 600/500 |
| 5,632,278 | A | 5/1997 | Rometsch |
| 5,666,404 | A * | 9/1997 | Ciccotelli .............. A61B 5/024 128/904 |
| 6,162,181 | A | 12/2000 | Hynson et al. |
| 6,497,668 | B2 | 12/2002 | Nishibayashi |
| 6,689,069 | B2 | 2/2004 | Bratteli et al. |
| 6,694,821 | B2 | 2/2004 | Yamakoshi et al. |
| 6,705,998 | B2 | 3/2004 | Stergiopoulos et al. |
| 6,814,077 | B1 | 11/2004 | Eistert |
| 7,111,625 | B2 | 9/2006 | Jackson |
| 7,678,059 | B2 | 3/2010 | Friedman et al. |
| 7,927,283 | B2 | 4/2011 | Riobo Aboy |
| 8,690,799 | B2 | 4/2014 | Telfort et al. |
| 8,747,328 | B2 | 6/2014 | Tichauer |
| 8,911,378 | B2 | 12/2014 | Whitaker et al. |
| 8,998,817 | B2 | 4/2015 | Pfeiffer et al. |
| 9,192,351 | B1 | 11/2015 | Telfort et al. |
| 9,781,984 | B2 | 10/2017 | Baranski et al. |
| 9,986,919 | B2 | 6/2018 | Lamego et al. |
| 10,064,561 | B2 | 9/2018 | Kinoshita et al. |
| 10,405,806 | B2 | 9/2019 | Baik et al. |
| 10,502,328 | B2 | 12/2019 | Kotani et al. |
| 10,874,307 | B2 | 12/2020 | Narasimhan et al. |
| 11,134,901 | B2 | 10/2021 | Fine et al. |
| 11,179,049 | B2 | 11/2021 | Niehaus et al. |
| 11,298,032 | B2 | 4/2022 | Mou et al. |
| 11,576,583 | B2 | 2/2023 | Dana et al. |
| 2004/0044288 | A1 | 3/2004 | Gorenberg et al. |
| 2006/0111637 | A1 | 5/2006 | Jacober et al. |
| 2007/0185402 | A1 | 8/2007 | Yang et al. |
| 2007/0203416 | A1 | 8/2007 | Lowe |
| 2009/0012411 | A1 | 1/2009 | Lowe et al. |
| 2010/0106029 | A1* | 4/2010 | Fraden ............... A61B 5/02208 600/490 |
| 2012/0136262 | A1* | 5/2012 | Sawanoi ............ A61B 5/0225 600/493 |
| 2012/0209129 | A1* | 8/2012 | Smith ................. A61B 5/0225 600/493 |
| 2012/0238887 | A1 | 9/2012 | Gerdt et al. |
| 2013/0060147 | A1* | 3/2013 | Welch ............... A61B 5/02208 600/479 |
| 2013/0144176 | A1 | 6/2013 | Lec |
| 2013/0150736 | A1 | 6/2013 | Romano |
| 2014/0187987 | A1 | 7/2014 | Fraden et al. |
| 2014/0309541 | A1 | 10/2014 | Yamashita et al. |
| 2015/0094602 | A1* | 4/2015 | Yamashita ......... A61B 5/02141 600/494 |
| 2015/0105675 | A1 | 4/2015 | Nakagawa et al. |
| 2016/0038044 | A1 | 2/2016 | Banerjee et al. |
| 2016/0106326 | A1 | 4/2016 | Bajaj et al. |
| 2016/0120418 | A1 | 5/2016 | Oksala et al. |
| 2017/0224357 | A1 | 8/2017 | Whalen et al. |
| 2017/0273579 | A1 | 9/2017 | Mori et al. |
| 2017/0290519 | A1* | 10/2017 | Zhou ................... A61B 5/0022 |
| 2018/0153418 | A1 | 6/2018 | Sullivan et al. |
| 2018/0177411 | A1 | 6/2018 | Du et al. |
| 2018/0184920 | A1 | 7/2018 | Rabinovich et al. |
| 2018/0338693 | A1 | 11/2018 | Li et al. |
| 2019/0261870 | A1 | 8/2019 | Nishikawa |
| 2020/0054221 | A1* | 2/2020 | Ward ................... A61B 5/7207 |
| 2020/0129078 | A1 | 4/2020 | Kanegae et al. |
| 2020/0232634 | A1 | 7/2020 | Sharrah |
| 2020/0323446 | A1 | 10/2020 | Nishida et al. |
| 2021/0030372 | A1 | 2/2021 | Lizio et al. |
| 2021/0059537 | A1 | 3/2021 | Nakagawa et al. |
| 2021/0127993 | A1* | 5/2021 | Matsumura .......... A61B 5/0295 |
| 2021/0169347 | A1* | 6/2021 | Ito .......................... A61B 5/352 |
| 2021/0236012 | A1 | 8/2021 | Nishida et al. |
| 2021/0251499 | A1* | 8/2021 | Ogawa ................. A61B 5/347 |
| 2021/0285436 | A1 | 9/2021 | Fukami et al. |
| 2021/0321889 | A1 | 10/2021 | Jain et al. |
| 2022/0000380 | A1 | 1/2022 | Li et al. |
| 2022/0054020 | A1 | 2/2022 | Tadele et al. |
| 2022/0087545 | A1 | 3/2022 | Jain et al. |
| 2022/0240803 | A1 | 8/2022 | Han et al. |
| 2022/0400959 | A1 | 12/2022 | Montgomery, II et al. |
| 2023/0063813 | A1 | 3/2023 | Smith et al. |
| 2023/0068620 | A1 | 3/2023 | Tadele et al. |

FOREIGN PATENT DOCUMENTS

| | | | |
|---|---|---|---|
| CN | 106037698 | | 10/2016 |
| CN | 110099607 | | 8/2019 |
| CN | 110301906 | | 10/2019 |
| CN | 110301907 | | 10/2019 |
| GB | 2575945 | A * | 1/2020 |
| JP | 3120617 | U | 3/2006 |
| JP | 3121082 | U | 4/2006 |
| JP | 2008178541 | | 8/2008 |
| JP | 2020043931 | | 3/2020 |
| JP | 2021143647 | | 9/2021 |
| KR | 20180033018 | | 4/2018 |
| WO | WO 11/023343 | | 3/2011 |
| WO | WO 19/010615 | | 1/2019 |
| WO | WO 20/016139 | | 1/2020 |
| WO | WO 20/039826 | | 2/2020 |

OTHER PUBLICATIONS

U.S. Appl. No. 17/166,914, filed Feb. 3, 2021, Han et al.
U.S. Appl. No. 17/210,371, filed Mar. 23, 2021, Jain et al.
U.S. Appl. No. 17/354,775, filed Jun. 22, 2021, Montgomery II et al.
U.S. Appl. No. 17/398,775, filed Aug. 10, 2021, Jain et al.
Horsey, "YHE smartwatch wearable blood pressure monitor," geeky-gadgets.com/wearable-blood-pressure-monitor-07-02-2020, Feb. 7, 2020, 3 pages.

* cited by examiner

INTEGRATED FLEXIBLE SENSOR FOR BLOOD PRESSURE MEASUREMENTS

FIELD

The described embodiments relate generally to devices, methods and systems for measuring a physiological parameter of a user. More particularly, the present embodiments relate to flexible sensors that can be integrated with a blood pressure cuff and used to estimate a blood pressure of a user.

BACKGROUND

A user may monitor one or more of his or her physiological parameters by attaching a monitoring device, such as a blood pressure monitor, to one of his or her limbs. The blood pressure monitor may include an inextensible cuff that secures an inflatable bladder against a limb of the user. The inflatable bladder can be expanded and the inextensible cuff may cause the bladder to compress the limb, thereby compressing one or more blood vessels in the limb and restricting and/or stopping blood flow through the vessels. The various pressures in the inflatable bladder that restrict and/or stop blood flow through the vessels in the limb may be measured and used to determine one or more physiological parameters of a user such as a blood pressure of the user.

Techniques for determining blood pressure metrics, such as mean pressure, diastolic pressure and/or systolic pressure, include monitoring oscillatory pressure changes within the cuff due to changes in blood flow through a user's limb. In isolation, such oscillatory measurement may not be as accurate as desirable in determining some metrics such as systolic pressure and/or diastolic pressure.

SUMMARY

Embodiments described herein are directed to a blood pressure measurement device that includes a cuff operative to wrap around a limb of a user, a bladder coupled to the cuff and operative to compress the limb of the user when inflated, and a piezoelectric sensor coupled to the cuff. The piezoelectric sensor can be operative to detect blood flow through the limb of the user, and output a signal indicative of the blood flow. The blood pressure measurement device can also include a processor coupled with the piezoelectric sensor, where the processor is operative to filter the signal to isolate sounds corresponding to changes in the blood flow through the limb due to inflation of the bladder, correlate the isolated sounds with a pressure inside the bladder, and determine a blood pressure of the user at least partially based on correlating the isolated sounds with the pressure.

In some cases, the blood pressure measurement device can also include a pressure sensor. The pressure sensor can be operated to measure the pressure inside the bladder and output a second signal indicating the pressure to the processor. In some cases the cuff can define an upper edge and a lower edge, where the bladder is positioned between the upper edge and the piezoelectric sensor and the piezoelectric sensor is positioned between the cuff and the limb. In some examples, filtering the first signal to isolate the sounds comprises identifying a first sound indicative of restriction of the blood flow due to partial collapse of a blood vessel within the limb, and a second sound indicative of stoppage of the blood flow in the blood vessel.

In some cases, filtering the signal includes applying a first band pass filter having a first frequency range to the signal, applying a second band pass filter having a second frequency range to the signal, where the first frequency range comprises higher frequency components of the signal than the second frequency range. In some cases, the frequency components of the signal as a result of applying the first band pass filter are used to isolate the sounds corresponding to changes in the blood flow.

The blood pressure measurement device can also include a pump configured to inflate the bladder, where the piezoelectric sensor is operative to detect changes in sounds corresponding to blood flow within a frequency range, and the pump is configured to operate at a frequency that is greater than the frequency range. In some cases, the pump is an ultrasonic pump. In some examples, the piezoelectric sensor is configured to wrap around a substantial entirety of the limb. The piezoelectric sensor can be a differential piezoelectric sensor. In some embodiments, the sensor is positioned within an interior portion of the cuff.

Embodiments include a blood pressure measurement device that includes a cuff operative to wrap around a limb of a user, a bladder coupled to the cuff and operative to compress the limb of the user when inflated and a piezoelectric sensor coupled to the cuff, and operative to detect blood flow through the limb of the user. The blood pressure measurement device can also include a processor operative to receive a signal from the piezoelectric sensor that is indicative of the blood flow through the limb. The processor can also filter the signal to identify a first sound that corresponds to a change in the blood flow due to a partial collapse of a blood vessel within the limb, identify a second sound that corresponds to a stoppage of the blood flow in the blood vessel within the limb, and determine a blood pressure of the user at least partially based on the identified first and second sounds.

In some cases, the cuff includes an upper edge and a lower edge, the piezoelectric sensor is operative to wrap around the limb of the user when the cuff is worn by the user, the piezoelectric sensor is contained within the cuff, and the piezoelectric sensor is positioned between the bladder and the lower edge. The piezoelectric sensor can be positioned between the bladder and the limb when the cuff is worn by the user. The bladder can be contained within a proximal portion of the cuff, the piezoelectric sensor can be contained within a distal portion of the cuff, and the piezoelectric sensor can be separated from the bladder by a dampening material that is configured to isolate the piezoelectric sensor from frequencies corresponding to pressure oscillations within the bladder. In some examples, the signal is a first signal, the blood pressure measurement device can further include a pump coupled to the bladder and configured to inflate the bladder, and a pressure sensor coupled to the bladder and configured to output a second signal indicative of a pressure within the bladder.

In some embodiments, the processor is operative to receive the second signal from the pressure sensor, determine a first pressure within the cuff that correspond to identifying the first sound, and determine a second pressure within the cuff that corresponds to identifying the second sound. The processor can determine the blood pressure of the user from signals corresponding to inflation of the bladder.

Embodiments described herein include a method for measuring blood pressure of a user. The method can include inflating a bladder of a cuff to increase a pressure within the bladder to compress a blood vessel of the user, detecting, using a piezoelectric sensor, changes in blood flow through the blood vessel, where the changes correspond to collapse of the blood vessel and outputting a first signal indicative of the changes in the blood flow. The method can also include detecting, using a pressure sensor, the pressure within the bladder, and outputting a second signal indicative of the pressure. In some cases, the method includes filtering the first signal to identify a first sound that corresponds to a change in blood flow through the blood vessel due to partial collapse of the blood vessel, and identify a second sound that corresponds to a stoppage of blood flow in the blood vessel. A processor can be operated to receive the first and second signals, determine, using the first and second signals, a first pressure in the bladder corresponding to an occurrence of the first sound, determine, using the first and second signals, a second pressure in the bladder corresponding to an occurrence of the second sound, and estimate a blood pressure of the user using the first pressure and the second pressure.

In some cases, filtering the first signal can include using a first band pass filter to isolate portions of the first signal falling within a first frequency band corresponding to changes in sound of the blood flow and using a second band pass filter to isolate portions the first signal falling within a second frequency band corresponding to changes in the pressure within the bladder. The portions of the first signal falling within the first frequency band can be used to determine systolic and diastolic blood pressure of the user and the portions of the first signal falling within the second frequency band can be used to determine a mean blood pressure of the user. Inflating the bladder can include inflating the bladder until the second sound is identified.

BRIEF DESCRIPTION OF THE DRAWINGS

The disclosure will be readily understood by the following detailed description in conjunction with the accompanying drawings, wherein like reference numerals designate like structural elements, and in which.

Figure 1:
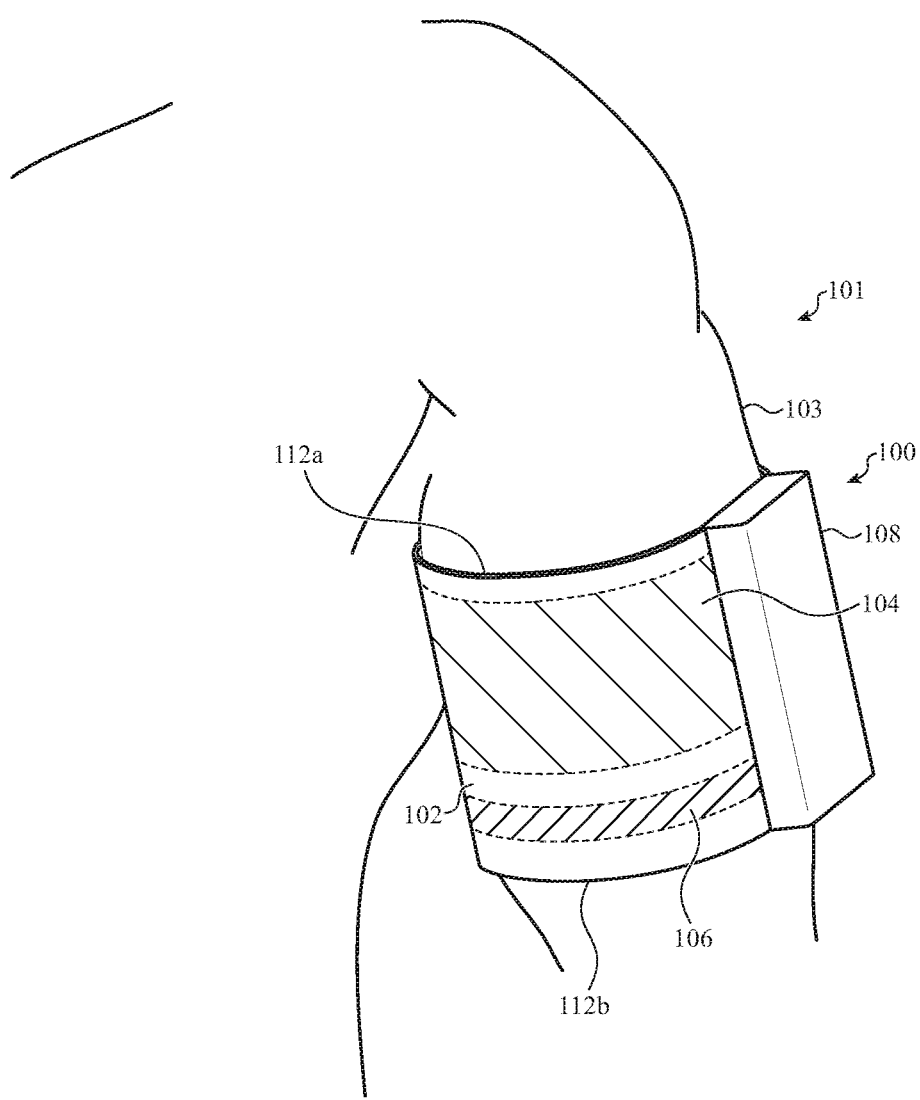
FIG. 1 shows an example of a blood pressure measurement device as worn by a user.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to a blood pressure measurement device having a cuff that wraps around a limb of a user and includes a bladder and a flexible blood flow sensor. The blood flow sensor can be used to detect sounds that correspond to changes in blood flow due to compression of the bladder around the limb. For example, the blood flow sensor can detect Korotkoff sounds that occur as a bladder compresses a user's limb to restrict and/or stop blood flow through vessels in the patient's limb. Signals from the blood flow sensor can be filtered to isolate sounds that occur due to changes in blood flow from other physical phenomena detected by the blood flow sensor such as signal components due to pressure fluctuations within the bladder. In some cases, the blood pressure measurement device can include a pressure sensor that is used to detect the air pressure within the bladder. The detected air pressure can be correlated to the Korotkoff sounds detected by the blood flow sensor to determine a blood pressure of a user. For example, a first Korotkoff sound that corresponds to partial collapse of the vessel can be used to determine a diastolic pressure, and a second Korotkoff sound that occurs just before the stoppage of blood flow through the vessel can be used to determine a systolic pressure of the user.

In some embodiments the blood flow sensor includes a flexible piezoelectric strip that is integrated with the cuff such that the blood flow sensor wraps around the limb of the user. Accordingly, the blood flow sensor can detect changes in blood flow through one or more vessels in the limb without requiring the blood flow sensor to be oriented in a specific relation to the limb. The flexible piezoelectric strip can conform to the limb of the user which can help couple the blood flow sensor to the limb and minimize gaps or other separations between the blood flow sensor and the limb. In some embodiments, having an flexible sensor integrated with the cuff, such as a flexible piezoelectric sensor, can allow the cuff and sensor to adapt to limbs of different sizes and shapes as well as changes in the shape or size of a limb such as due to movement. For example a flexible blood flow sensor may be more likely to remain coupled to a limb (e.g., lie flat against an arm) as compared to more rigid sensor. Such coupling between the flexible blood flow sensor and a limb can increase the signal quality such as by reducing noise due to air gaps, movement, etc.; increasing the signal strength detected by the sensor; and so on. The flexible blood pressure sensor can facilitate easy positioning of the cuff on a user by allowing the sensor to conform to a limb of the user in multiple orientations while maintaining close coupling of the sensor to the limb.

Additionally or alternatively, the blood flow sensor can be positioned downstream of the direction of blood flow through the limb with respect to the bladder. As the bladder is expanded to compress the limb, the piezoelectric sensor can detect downstream changes in blood flow due to compression of one or more blood vessels in the limb. In other embodiments, the blood flow sensor can be located upstream of the bladder, between the bladder and the limb, on a separate band or cuff from the bladder, or in any other suitable configuration.

The blood pressure measurement device can also include a pump for inflating the bladder. The bladder can be coupled with the cuff such that when it is inflated by the pump, the bladder expands inward to compress a limb of the user. In some cases, the pump can operate at frequencies that are above those detected by the blood flow sensor. For example, the pump can be an ultrasonic pump, and the blood flow sensor can detect frequencies due to changes in blood flow and that are below those produced by the ultrasonic pump. In this regard, noise produced by the pump and detected by the blood flow sensor may be reduced or separated from signal frequencies that are related to auditory changes in blood flow. In some cases, the flexible blood pressure sensor can react to changes in pressure in the bladder by conforming to the arm.

In some embodiments, signals produced by the blood flow sensor can be filtered to isolate, separate or remove different frequency ranges that correspond to different physical events that result from the inflating the bladder around a limb of a user. For example, portions of the blood flow sensor signal in lower frequency ranges may correspond to changes in pressure in the blood vessel due to the blood pressure of the user and/or compression of a limb by the cuff. Portions of the blood flow signal with higher frequency ranges may correspond to changes in sound due to collapse of the blood vessel from the compression of the cuff. Accordingly, filtering mechanisms, such as band pass filters may be used to separate portions of the blood flow signals that correspond to these different physical events.

In some embodiments, the blood pressure measurement device can include a pressure sensor for measuring a pressure within the bladder. The pressure sensor can output a pressure signal that indicates the pressure within the bladder. The blood pressure measurement device can include a processor that receives the blood flow sensor signal and the pressure sensor signal, and uses these signals to determine blood pressure metrics for a user. For example, the blood flow signal can be filtered and processed to identify the occurrence of Korotkoff sounds due to compression of the limb. A first Korotkoff sound, that occurs when the bladder compresses the limb enough to begin to collapse the blood vessel and cause changes in the blood flow (e.g., inducing turbulent flow) can be identified using the blood flow signal and correlated to a first detected pressure in the bladder. This first pressure can be used to determine the diastolic blood pressure of a user. A second Korotkoff sound that occurs when the bladder compresses the limb enough to stop blood flow through the blood vessel can be identified using the blood flow signal and correlated to a second detected pressure in the bladder. This second pressure can be used to determine a systolic pressure of a user.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 shows an example of a blood pressure measurement device 100 as worn by a user 101. The blood pressure measurement device 100 can include a cuff 102 that wraps around a limb 103 of a user 101. The cuff 102 can include a bladder 104 that is operative to expand inward to compress the limb 103 thereby restricting blood flow through one or more vessels in the limb 103. The cuff can also include a flexible sensor 106 that wraps around the limb 103 and is operative to detect blood flow through blood vessels in the limb 103, as well as output a signal that is indicative of the detected blood flow. The blood pressure measurement device 100 can also include a housing 108 that is attached to the cuff 102.

The cuff 102 can form an elongated flexible sheet that extends from a first end portion to a second end portion. The cuff 102 can be wrapped around the limb 103 and the first and second end portions can be coupled by a fastening mechanism, which can include any suitable mechanism that secures the first and second ends of the cuff 102, examples of which can include hook-and-loop fasteners, clips, zippers, buttons, and so on. In some cases, the first and second end portions can be permanently joined and the cuff 102 can be placed on the limb 103 by a user 101 sliding a limb 103 through a central opening defined by the cuff 102. In some cases, the cuff 102 can be substantially inextensible such that the cuff 102 remains approximately the same size when the bladder 104 is inflated around the limb 103. Accordingly, inflating the bladder 104 causes the bladder 104 to expand inward thereby compressing the limb 103.

In some embodiments, the flexible sensor 106 can be integrated with the cuff 102 to conform to the limb 103 when the cuff 102 is worn by the user 101. For example, the flexible sensor 106 can be a flexible piezoelectric sensor that defines an elongated strip that can wrap around a portion or a substantial entirety of the limb 103. The flexible sensor 106 can be integrated with the cuff 102 material such that it conforms to the shape of the limb 103 that the cuff 102 is wrapped around. This can include the flexible sensor 106 and/or cuff 102 conforming to various contours of the limb 103, changes in shape of the limb 103, and the blood pressure measurement device 100 being worn in different orientations around the limb 103. For example, the cuff 102 can be formed from an elastic material that conforms to the limb 103, and/or changes in the shape and size of the limb 103. The flexible sensor 106 can be coupled to the elastic cuff 102 such that the sensor 106 also conforms to the limb 103 and/or changes in shape and size of the limb 103. In this regard, the flexible sensor 106 may remain closely coupled to the limb 103, which can increase the quality of blood flow signals detected by the sensor 106, for example, by increasing the signal strength, reducing noise, and so on.

The cuff 102 can include an upper edge 112a and a lower edge 112b, and be positioned on the limb 103 such that the upper edge 112a is upstream with respect to the direction of blood flow through the limb 103 (and, thus, the lower edge 112b is downstream). In this regard, blood flowing through blood vessels in the limb 103 first passes the upper edge 112a before passing the lower edge 112b of the cuff 102. In some embodiments, the bladder 104 is positioned between the upper edge 112a and the sensor 106 such that the bladder 104 is upstream of the sensor 106. Accordingly, when the bladder 104 is operated to compress the limb 103 it changes and/or stops the flow of blood past the sensor 106. In other embodiments, the sensor 106 can be located between the bladder 104 and the upper edge 112a (e.g., upstream of the bladder 104), can be located between the bladder 104 and the limb (e.g., overlapping with the bladder 104), or include multiple sensors 106 located upstream, downstream, overlapping with the bladder 104, or any combination thereof.

The housing 108 can contain components that are used to take a blood pressure measurement. In some embodiments, the housing 108 can include an air pump for inflating the bladder 104 and be positioned along at least a portion of the interior of the cuff 102. The housing 108 can further contain one or more components for operating the sensor 106, such as a pressure sensor that is used to measure a pressure within the bladder 104, the air pump, a processor, memory, display, power source, and so on.

The blood pressure measurement device 100 can be operated to take a blood pressure of the user 101 by using the sensor 106 to detect changes in blood flow due to collapse of blood vessels caused by compression of the limb 103. An air pump can be operated to inflate the bladder 104. As the bladder 104 inflates the sensor 106 can be operated to detect changes in blood flow through blood vessels in the limb 103 and output a first signal that is indicative of the blood flow. A pressure sensor can also be operated to measure pressure within the bladder 104, and output a second signal that is indicative of the pressure within the bladder 104. The first signal can be processed such as by filtering and/or performing analysis to identify sounds in the blood vessel that result from expanding the bladder 104 and compressing blood vessels within the limb 103. For example, a first sound can be identified in the sensor 106 signal that corresponds to the blood vessel beginning to collapse from the pressure applied by the bladder 104. In some cases, this first sound may correspond to a first Korotkoff sound. The air pressure in the bladder 104 corresponding to the first sound can be determined from the air pressure sensor signal and used to estimate the diastolic blood pressure of the user 101. The air pressure in the bladder 104 can continue to be increased and a second sound that occurs just prior to the stoppage of blood flow through the vessel can be identified from the sensor 106 signal. In some cases, this second sound can correspond to a second Korotkoff sound. The air pressure in the bladder 104 corresponding to the second sound can be determined from the air pressure sensor signal and used to estimate a systolic blood pressure of the user 101.

Figure 2:
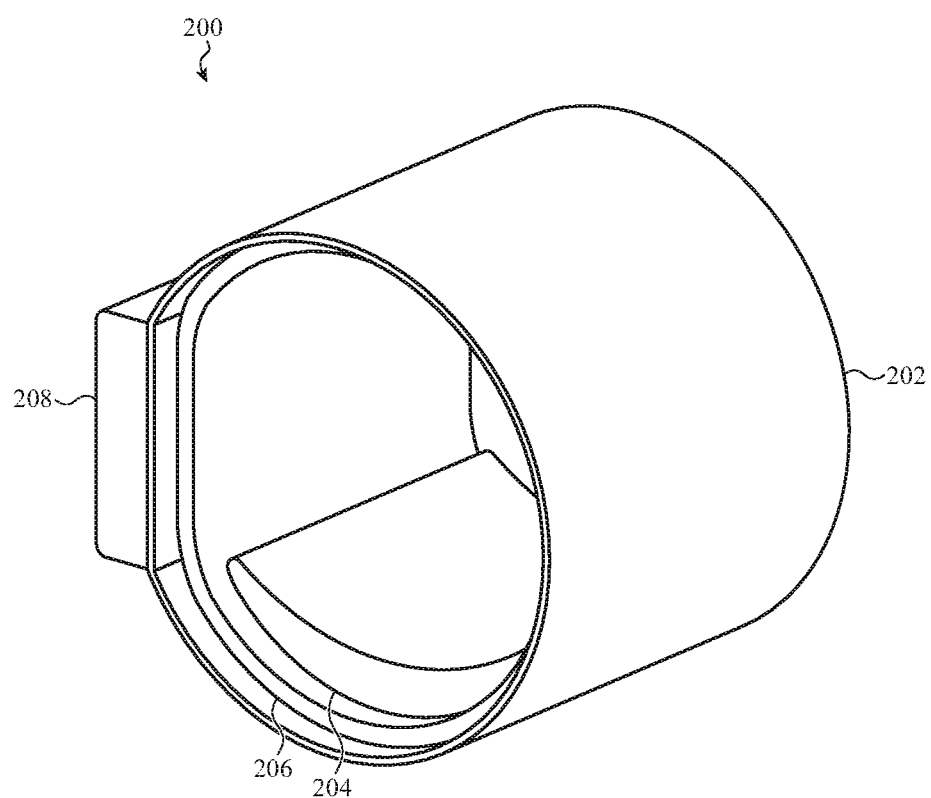
FIG. 2 shows an example of a blood pressure measurement device.

FIG. 2 shows an example of a blood pressure measurement device 200. The blood pressure measurement device 200 can include a cuff 202 having a bladder 204, a sensor 206, and a housing 208, and may be an example of the blood pressure measurement devices described herein, such as blood pressure measurement device 100 having cuff 102 having bladder 104, sensor 106 and housing 108.

In some embodiments, the sensor 206 is configured as a strip that extends around the cuff 202 such that the sensor encircles or partially encircles a limb when the cuff is worn by a user. Accordingly, the sensor 206 may be able to detect blood flow through blood vessels in the limb when the cuff 202 it is worn in multiple different orientations. In some cases, the sensor 206 includes one or more flexible components such that the sensor 206 can conform to a limb of a user and/or changes in the shape and the size of the limb.

The sensor 206 can be configured to detect different physical events that result from inflating the bladder 204 around a limb of a user. In some cases, the sensor 206 is configured to detect changes in blood flow through the limb due to compression of the limb by the bladder 204. For example, as the bladder 204 is inflated and compresses the limb, blood vessels within the limb may begin to collapse. This collapse may result in changes in blood flow through the vessel such as a transition from laminar flow when to the blood vessel is not collapsed to turbulent flow when the blood vessel begins to collapse. The sensor 206 can detect such changes from laminar to turbulent flow by detecting changes in sound corresponding to this transition.

In some cases, the sensor 206 can be a piezoelectric sensor that is operative to detect sounds or changes in sounds that are associated with different blood flow patterns or events. For example the sensor 206 can be a differential piezoelectric sensor that includes electrodes attached to opposite sides of a piezoelectric material and operated to differentially sense sounds produced by the flow or change in flow of blood through a vessel. A differential sensor can be operated to provide high-fidelity sensing of mechanical vibrations (such as those due to blood flow or changes in blood flow) while reducing noise by producing out-of-phase signals corresponding to mechanical vibrations that can constructively interfere and amplify the mechanical vibrations. The piezoelectric material can include polyvinylidene difluoride (PVDF), such as a PVDF film, PVDF-copolymer, a PVDF/poly-L-lactide (PLLA) blend, or other material that generates an electric response in response to mechanic stress. The differential sensor can also include a differential amplifier that is connected to the first and second electrodes that are attached to opposite sides of the piezoelectric material. The differential amplifier can provide an amplified differential output (e.g., an amplification of a pair of signals obtained from the piezoelectric material) that includes biological vibrations sensed by the piezoelectric material. The signals from each of the electrodes in the differential output can be subtracted to produce amplified signals corresponding to mechanical vibrations, such as vibrations due to blood flow. In some cases, the sensor 206 can include a flexible piezoelectric sensor, such as a flexible differential piezoelectric sensor. For example, the flexible sensor 206 may be a formed in a film or strip that can bend with the cuff 202 around the limb of the user.

In other cases the sensor 206 can include rigid piezoelectric sensors, microelectromechanical (MEMs) based pressure sensors, MEMs microphone sensors, MEMs accelerometers, electret microphones, mini-voice coils, fabric based sensors, and the like, or a combination thereof.

The sensor 206 can detect frequency ranges that correspond to sounds or changes in sound produced by blood flowing through vessels in a user's limb. Additionally, or alternatively, the sensors 206 may detect lower frequencies such as those corresponding to pressure changes within the bladder 204, which can include oscillatory pressure changes that result from blood pressure pulses within the limb. In some examples, the sensor 206 can operate in frequency ranges of about 0.5 Hz to 2 kHz. In other examples, the sensor 206 can operate in frequency ranges below 0.5 Hz and to above 2 kHz.

Figure 3:
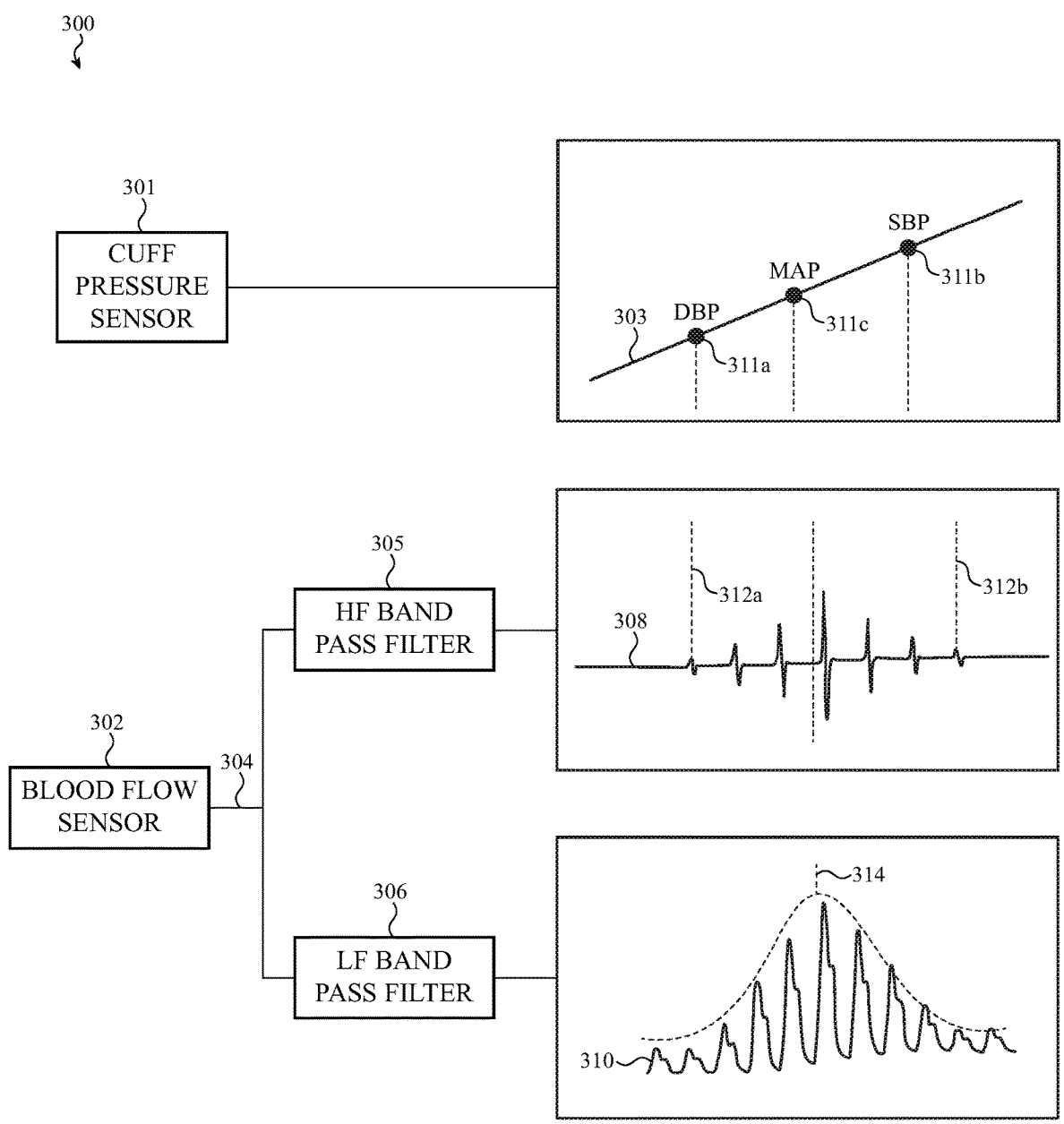
FIG. 3 shows an example measurement output from a blood pressure measurement device as described herein.

FIG. 3 shows an example of measurement output 300 from a blood pressure measurement device as described herein. The blood pressure measurement device can be an example of the blood pressure measurement device described herein (e.g., blood pressure measurement devices 100 and 200) and can include a pressure sensor 301, which may be one of the pressure sensors described herein and a blood flow sensor 302, which may be one of the sensors described herein (such as sensors 106 and 206). The pressure sensor 301 can output a pressure signal 303, and the blood flow sensor 302 can to output a blood flow signal 304.

As described herein, the cuff can be positioned around a limb of user and the bladder can be inflated to compress the limb of the user. As the bladder inflates the pressure in the bladder can increase. The pressure sensor 301 can measure the pressure inside the bladder and output the pressure signal 303 during the cuff inflation process. That is, blood pressure measurements can be taken while the cuff is being inflated. In some cases, this can include increasing the pressure inside the cuff at a controlled rate, for example, the pressure inside the cuff can be increased at a constant rate.

At the beginning of the bladder inflation process, the pressure may be at its lowest point and as the bladder inflates the pressure can increase to compress the limb of the user and collapse the blood vessels within the limb. When the bladder pressure reaches the diastolic pressure in the blood vessel, the blood vessel may begin to collapse, thereby affecting the flow of blood through the vessel. This partial collapse of the blood vessel can result in the blood flow transitioning from laminar flow to a turbulent flow, and this transition can be used to estimate the diastolic blood pressure 311*a*. For example, the pressure detected by the pressure sensor 301 at this initial vessel collapse can be used to estimate the diastolic blood pressure 311*a*. As the bladder continues to be inflated, the increasing pressure can cause the blood vessel to collapse further and eventual stop blood from flowing through the vessel. The pressure detected by the pressure sensor that causes the stoppage of blood flow through the blood vessel can be used to estimate the systolic blood pressure 311*b*.

As the bladder is being inflated, the blood flow sensor 302 can detect changes in blood flow through the vessel and output the blood flow signal 304. In some cases, the blood flow sensor 302 may detect changes of one or more physical events that result from the blood flow through the vessel. For example, the blood flow sensor can detect sounds that correspond to the blood moving through the vessel, which includes transitions from laminar to turbulent flow, stoppage of blood flow, changes in speed or velocity of the blood and so on. Additionally or alternatively, the blood flow sensor can also detect pressure changes in the blood volume within the vessel due to pumping of the heart. In some cases, these physical events can be detected in different frequency ranges by the blood flow sensor 302.

In some embodiments the blood flow signal 304 can be filtered to separate physical events occurring in different frequency ranges from each other. For example, sounds corresponding to movement of blood through the blood vessels may be detected in a higher frequency band than pressure changes occurring in the blood volume. Accordingly, the blood flow signal 304 obtained during the blood pressure measurement can be filtered using a high frequency band pass filter 305 to separate sound events occurring due to changes in the blood flow from pressure changes. The resulting higher frequency signal can be analyzed to produce a sound signal 308, which can be used to identify a first sound 312*a* that is indicative of the transition from laminar to turbulent flow that occurs as a result of partial collapse of the blood vessel when the bladder pressure on the vessel reaches the diastolic blood pressure. Additionally or alternatively, the sound signal 308 can be used to identify a second sound 312*b* that is indicative of the stoppage of blood flow through the blood vessel that occurs as a result of the bladder pressure on the vessel reaching the systolic blood pressure. The occurrence of the first sound 312*a* can be used to determine a pressure in the bladder from the pressure signal 303, which can be used to estimate the diastolic blood pressure 311*a* of the user. The occurrence of the second sound 312*b* can be used to determine a pressure in the bladder from the pressure signal 303, which can be used to estimate the systolic blood pressure 311*b* of the user.

In some embodiments, the blood flow signal 304 can be filtered using a low frequency band pass filter 306 to separate pressure changes occurring in the blood volume from the sound signals. This resulting lower frequency signal can be analyzed to produce an oscillometric signal 310, which can be used to identify pressure fluctuations within the blood vessel as a result of the heart beating. In some cases, a peak oscillation amplitude 314 in the oscillometric signal 310 can be used to identify a mean blood pressure 311*c* using the pressure signal 303. In some cases, both the sound signal 308 and the oscillometric signal 310 can be utilized to identify blood pressure metrics such as diastolic blood pressure 311*a*, systolic blood pressure 311*b*, mean blood pressure 311*c*, or a combination thereof.

In some embodiments, the blood pressure measurement device can be operated to determine one or more blood pressure metrics as described herein by increasing the pressure from a lower pressure to a higher pressure. In other embodiments the blood pressure measurement device can be operated to determine blood pressure metrics as described herein by decreasing the pressure from a higher pressure such as a pressure above the systolic pressure to a lower pressure. In some cases, both an increasing pressure processes and decreasing pressure process can be combined and compared to determine one or more blood pressure metrics as described herein.

In some cases, the high frequency band pass filter 305 can be configured to operate in about the 40 Hz to 500 Hz range. In other cases, the high frequency band pass filter 305 can be configured to operate in about the 20 Hz to 1000 Hz, 2000 HZ or higher. Additionally or alternatively, the low frequency band pass filter 306 can be configured to operate in about the 0.5 Hz to 20 Hz range. In other cases the low frequency band pass filter 306 can be configured to operate in the 0.1 Hz to 20 Hz or higher frequency range. In some embodiments, the high frequency band pass filter 305 and/or low frequency band pass filter 306 can be implemented as physical circuit. In other cases, the high frequency band pass filter 305 and/or low frequency band pass filter 306 can be implemented in software running on a processor. In other cases, the blood pressure measurement device can include one or more physical components that function as filters. For example, the blood flow sensor 302 could be coupled to the cuff by a low frequency dampening material that isolates the blood flow sensor from pressure changes from compression of the blood vessel that are exerted on the cuff.

FIGS. 4A-4D show examples of a blood pressure measurement device 400 having different cuff 402, bladder 404 and sensor 406 configurations. The blood pressure measurement device 400 can be an example of the blood pressure measurement devices as described herein such as blood pressure measurement devices 100 and 200.

Figure 4A:
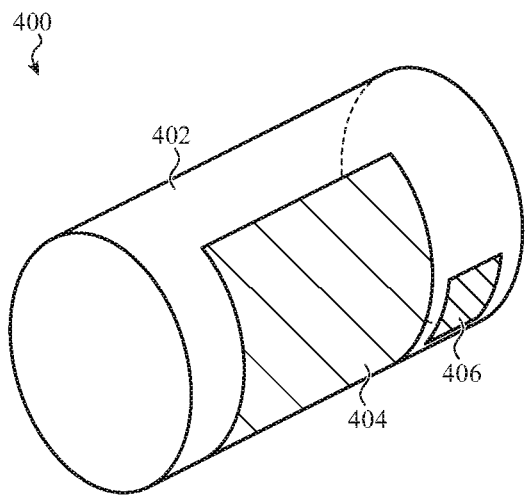
FIGS. 4A-4D show examples of a blood pressure measurement device that include a flexible sensor used to perform blood pressure measurements.

In the example of FIG. 4A, the blood pressure measurement device 400 can include a cuff 402 that is coupled with the bladder 404 and the sensor 406. The sensor 406 can be located between the bladder 404 and an edge of the cuff 402. In this regard, the sensor 406 can either be positioned downstream to the direction of blood flow from the bladder 404 or upstream to the direction of blood flow depending on how the sensor 406 is positioned on the limb. In some cases, the sensor 406 can be positioned within a pocket formed in the cuff 402. In other cases, the sensor 406 can be coupled with the cuff 402 via other methods such as by using adhesives. Such a configuration may help isolate the sensor 406 from noise produced by the bladder 404.

In some embodiments, the sensor 406 can be integrated with the bladder 404 itself. For example, the bladder 404 can include a cutout section. The sensor 406 can be positioned within the cutout and coupled to the bladder 404 such that the bladder 404 and the sensor 406 form an air-tight chamber. In some cases, this can include using adhesives to couple the sensor 406 to the bladder 404, in other cases the sensor 406 can be welded to the bladder, and if further cases other suitable bonding techniques can be used.

In some cases, the sensor 406 can be woven into the cuff 402 and/or the bladder 404 materials. For example, the sensor 406 can be formed from a single or multiple PVDF fibers that are woven with the cuff 402 and/or bladder 404.

Figure 4B:
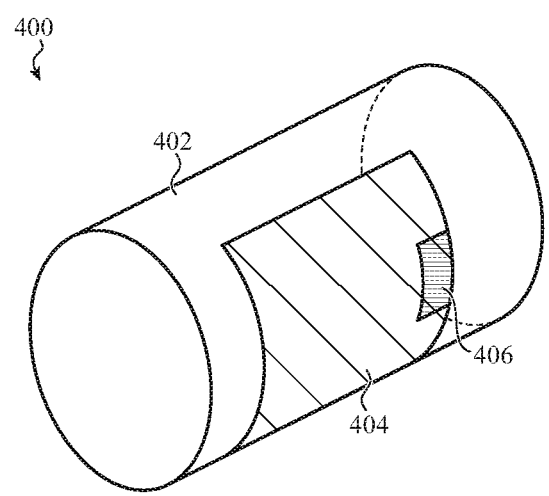

In the example of FIG. 4B, the blood pressure measurement device 400 can include a sensor 406 that is positioned between the bladder 404 and an inside surface of the cuff 402. In this configuration, the sensor 406 would be located between the bladder 404 and a limb of a user when the cuff 402 is worn by a user. The sensor 406 can be coupled with the cuff 402 using any suitable attachment mechanism such as by using adhesives. Such a sensor configuration may aid coupling of the sensor 406 to a limb of a user by the bladder 404 pressing the sensor 406 against the limb when it is inflated during a blood pressure measurement.

Figure 4C:
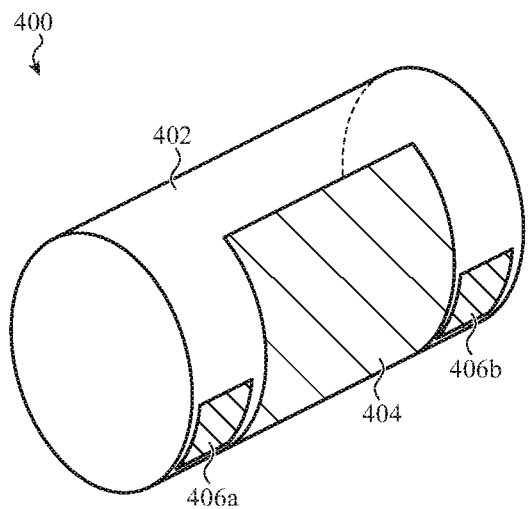

In the example of FIG. 4C, the blood pressure measurement device 400 can include multiple sensors 406 coupled with the cuff 402. In some embodiments a first sensor 406a can be positioned adjacent to a first edge of the cuff 402 and a second sensor 406b can be positioned adjacent to a second edge of the cuff 402. Such a sensor configuration may be used to differentiate noise from blood flow events. For example, as the bladder 404 is inflated or deflated, creases in the cuff 402 and/or bladder 404 can cause crackling, which may be detected by one or both of the sensors 406. If a sound is detected by both sensors 406, then it may be determined that the sound is noise, such as due to crackling. If the sound is only detected by a single sensor such as the second sensor 406b, which is positioned downstream of the bladder 404, then it can be determined that the sound is due to changes in blood flow due to compression of the limb by the bladder.

Figure 4D:
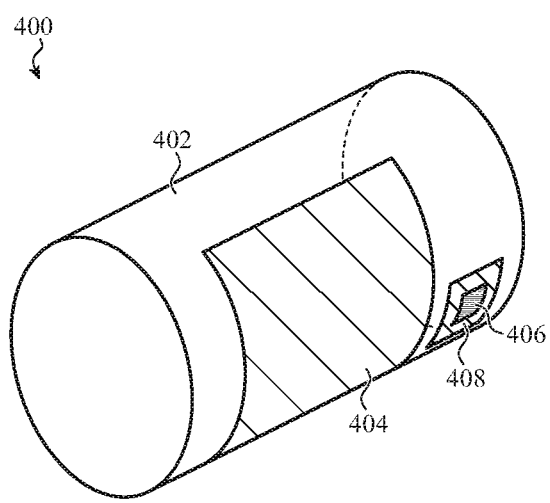

In the example of FIG. 4D, the blood pressure measurement device 400 can include a sensor 406 that is positioned within a coupling pad 408 that is attached to the cuff 402. The coupling pad 408 can be used to increase the acoustic coupling of the sensor 406 to the limb. In some cases, the coupling pad 408 can isolate the sensor 406 from noise and/or increase a comfort of the cuff 402.

In further embodiments, the sensor 206 can be a flexible sensor that is integrated with the cuff 202 in a variety of ways. In some cases, the sensor 206 can be contained within the cuff 202. For example, the cuff 202 can be formed from multiple layers of material that are connected, and the sensor 206 can be positioned between different layers of cuff 202. In this regard, the sensor 206 may be contained within the cuff 202 material and bend, flex or otherwise move with the cuff to conform to a limb of a user. In other examples, the sensor 206 can be coupled to an inner surface of the cuff 202 such that the sensor 206 can be positioned directly against the limb when the cuff is worn by the user. In further examples, the sensor 206 can be contained within an enclosure that is distinct from the cuff 202. For example, the enclosure may be made from a material that aid or enhances coupling of the sensor 206 to the limb, which may include elastic materials that stretches to conform to a limb. Such materials combined with a flexible sensor 206 can aid or enhance acoustic coupling between the sensor 206 and the skin. In other examples, the sensor may be a discrete component that is distinct from the cuff 202

Figure 5:
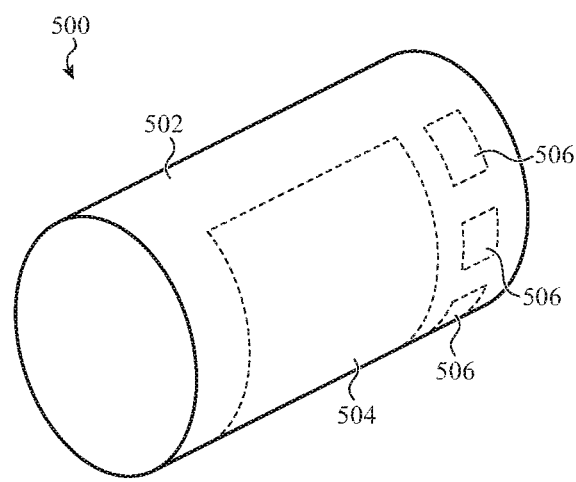
FIG. 5 shows an example of a blood pressure measurement device that includes multiple flexible sensors used to perform blood pressure measurements.

FIG. 5 shows an example of a blood pressure measurement device 500 that includes multiple flexible sensors 506 that can be used to perform blood pressure measurements. The blood pressure measurement device 500 can be an example of the blood pressure measurement device as described herein (e.g., blood pressure measurement devices 100, 200 and 400). In some embodiments, the sensors 506 can be positioned around a circumferential direction of the cuff 502 and each sensor can be operated independently such that each sensor outputs a unique signal indicative of blood flow through vessels in a user's limb as described herein. In some cases, the multiple sensors 506 can be compared and the sensor 506 or sensors 506 with stronger signals can be used to estimate the blood pressure of the user. In other cases, the signals from the multiple sensors 506 can be used to orient the cuff on the user, for example, the multiple sensors 506 can be used to determine a cuff orientation that produces stronger and/or less noisy sensor signals.

Figure 6:
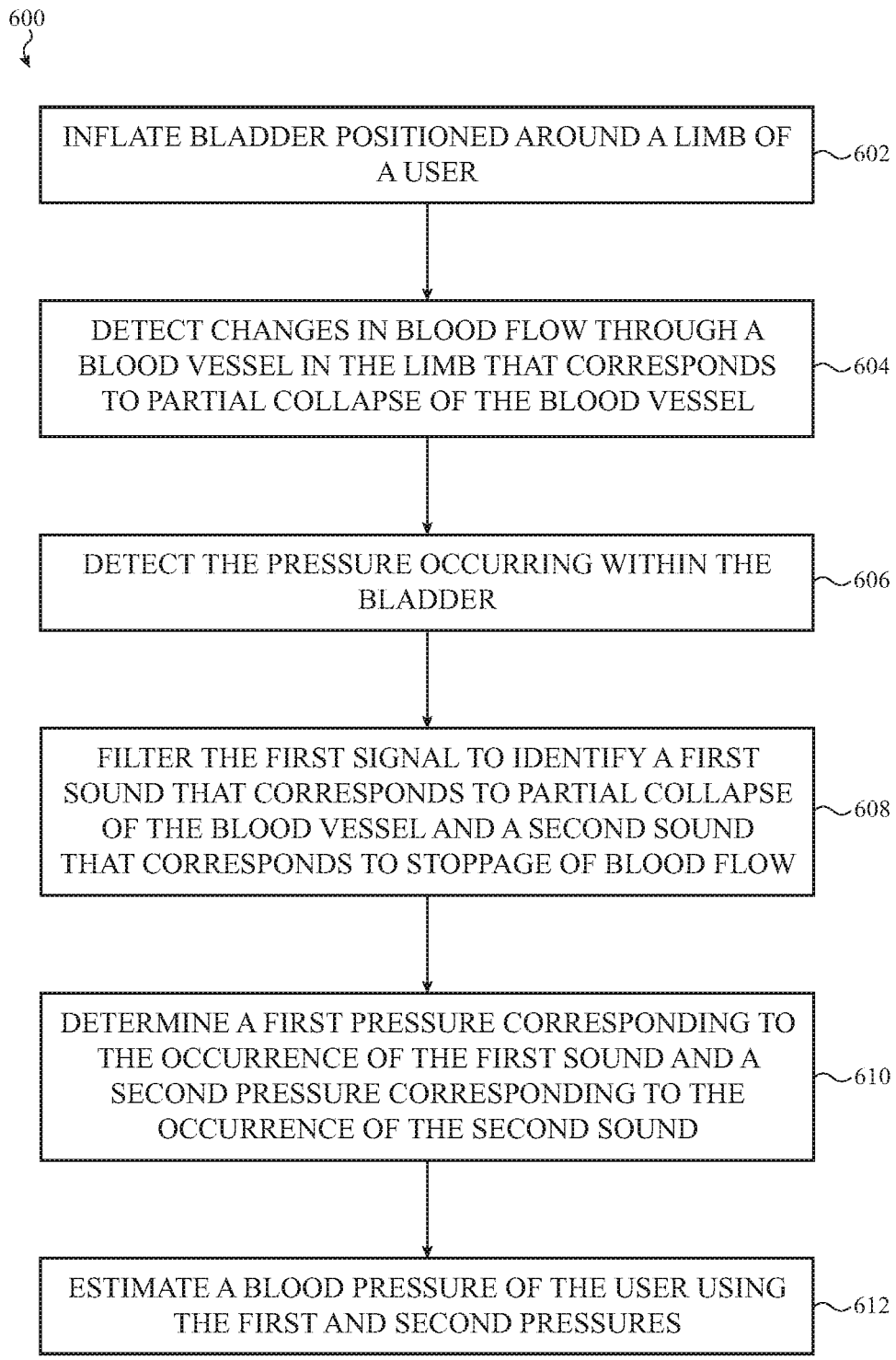
FIG. 6 shows an example method of operating a blood pressure measurement device.

FIG. 6 shows an example method 600 of operating a blood pressure measurement device such as the blood pressure measurement device as described herein.

At 602, the method 600 can include inflating a bladder positioned around a limb of a user. At 604, the method 600 can include using a sensor to detect changes in blood flow through the blood vessel, where the changes corresponding to collapse of the blood vessel. The sensor can output a first signal from indicative of the changes in the blood flow. In some cases, the sensor can be a differential piezoelectric sensor that is integrated with the cuff and configured to wrap around the limb of a user. The differential piezoelectric sensor can detect changes in sound of the blood flow that indicate a laminar to turbulent blood flow transition in the cuff.

At 606, the method 600 can include using a pressure sensor to detect the pressure within the bladder and output a second signal indicative of the pressure. In some cases, the pressure sensor can be a barometric pressure sensor configured to detect an air pressure within the bladder. Examples of pressure sensors can include, piezoelectric sensors, capacitive, electromagnetic, strain gauge and so on.

At 608, the method 600 can include filtering the first signal to identify a first sound that corresponds to a change in blood flow through the blood vessel due to partial collapse of the blood vessel and identify a second sound that corresponds to a stoppage of blood flow in the blood vessel. In some cases, a band pass filter can be used to filter the first signal, for example to separate measured frequencies that correspond to sounds of blood flow moving through the blood vessels. The band pass filter can be implemented using any suitable filtering techniques such as those described herein.

At 610, the method 600 can include determining, using the first and second signals, a first pressure in the bladder corresponding to an occurrence of the first sound, determine, using the first and second signals, a second pressure in the bladder corresponding to an occurrence of the second sound.

At 612, the method 600 can include estimating a blood pressure of the user using the first pressure and the second pressure. For example, the measured pressure in the bladder at the occurrence of the first sound can be used to estimate the diastolic blood pressure. Additionally or alternatively, the measured pressure in the bladder at the occurrence of the second sound can be used to estimate the systolic blood pressure. In some cases, the measured first and second pressure can be modified by scaling factor, to account from loss in pressure between the cuff and limb. In other cases, the first and second pressures can be modified in other ways, for example to account for sensor drift, noise, or other factors that may affect the pressure sensor readings.

Figure 7:
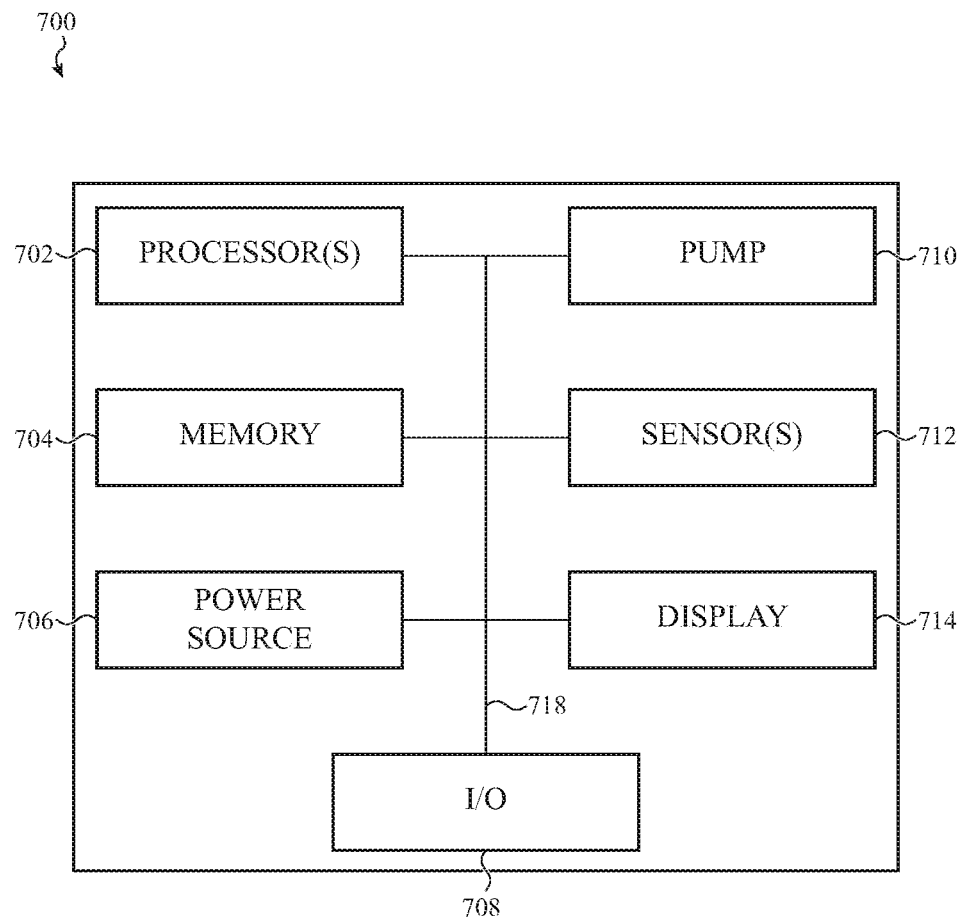
FIG. 7 is an example block diagram of a blood pressure measurement device.

FIG. 7 is an example block diagram of a blood pressure measurement device 700, which may in some cases take the form of any of the blood pressure measurement devices or components thereof described with reference to FIGS. 1-6. The blood pressure measurement device 700 can include a processor 702, memory 704, a power source 706, an input/output (I/O) mechanism (or device) 708, a pump 710, one or more sensors 712, and a display 714.

The processor 702 can control some of all of the operations of the blood pressure measurement device 700. The processor 702 can communicate, either directly or indirectly, with some or all of the components of the electronic device 700. For example, a system bus or other communication mechanism 718 can provide communication between the processor 702, the memory 704, the power source 706, input/output (I/O) mechanism 708, the pump 710, the one or more sensors 712, the display 714 and the output device 714.

The processor 702 can be implemented as any electronic device capable of processing, receiving, or transmitting data or instructions. For example, the processor 702 can be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitable computing element or elements.

It should be noted that the components of the blood pressure measurement device 700 can be controlled by multiple processors. For example, select components of the electronic device 700 (e.g., a sensor 712) may be controlled by a first processor and other components of the blood pressure measurement device 700 (e.g., the display 714) may be controlled by a second processor, where the first and second processors may or may not be in communication with each other.

The memory 704 can store electronic data that can be used by the blood pressure measurement device 400. For example, the memory 704 can store electrical data or content such as, for example, audio and video files, documents and applications, device settings and user preferences, timing signals, control signals, and data structures or databases. The memory 704 can be configured as any type of memory. By way of example only, the memory 704 can be implemented as random access memory, read-only memory, Flash memory, removable memory, other types of storage elements, or combinations of such devices.

The power source 706 can be implemented with any device capable of providing energy to the blood pressure measurement device 700. For example, the power source 706 may be one or more batteries or rechargeable batteries. Additionally or alternatively, the power source 706 can be a power connector or power cord that connects the blood pressure measurement device 700 to another power source, such as a wall outlet.

The I/O mechanism 708 can transmit and/or receive data from a user or another electronic device. An 110 mechanism 708 can include a display, a touch sensing input surface, one or more buttons (e.g., a graphical user interface "home" button), one or more cameras, one or more microphones or speakers, one or more ports, such as a microphone port, and/or a keyboard. Additionally or alternatively, an 110 device or port can transmit electronic signals via a communications network, such as a wireless and/or wired network connection. Examples of wireless and wired network connections include, but are not limited to, cellular, Wi-Fi, Bluetooth, IR, and Ethernet connections.

The blood pressure measurement device 700 can also include a pump 710 that is used to inflate the bladder. The pump 710 can be an air pump such as an ultrasonic air pump, diaphragm pump, and so on. The pump 710 can be powered by the power source 706 and controlled by the processor 702. The pump 710 can be capable of inflating the bladder to pressures that are above typical human blood pressures such as up to or higher than 180 mm Hg. In some cases, the pump 710 can be configured to apply a linear or smooth pressure ramp within the bladder. The pump 710 can also be configured to provide a linear, or constant, pressure release within the bladder, which may be used to acquire blood pressure measurements during deflation of the cuff.

The blood pressure measurement device 700 may also include one or more sensors 712 positioned almost anywhere on the blood pressure measurement device 700. The sensor(s) 712 can be configured to sense one or more type of parameters, such as but not limited to, pressure, sound, light, touch, heat, movement, relative motion, biometric data (e.g., biological parameters), and so on. For example, the sensor(s) 712 may include a pressure sensor, an auditory sensor, a heat sensor, a position sensor, a light or optical sensor, an accelerometer, a pressure transducer, a gyroscope, a magnetometer, a health monitoring sensor, and so on. Additionally, the one or more sensors 712 can utilize any suitable sensing technology, including, but not limited to, capacitive, ultrasonic, resistive, optical, ultrasound, piezo-electric, and thermal sensing technology.

The blood pressure measurement device 700 may also include a display, a display 714. The display 714 may include a liquid-crystal display (LCD), organic light emitting diode (OLED) display, light emitting diode (LED) display, or the like. If the display 714 is an LCD, the display 714 may also include a backlight component that can be controlled to provide variable levels of display brightness. If the display 714 is an OLED or LED type display, the brightness of the display 714 may be controlled by modifying the electrical signals that are provided to display elements. The display 714 may correspond to any of the displays shown or described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A blood pressure measurement device comprising:
   a flexible cuff operative to wrap around a limb of a user;
   a bladder coupled to the flexible cuff and configured to be secured to the limb of the user by the flexible cuff, the bladder operative to compress the limb of the user during inflation and decompress the limb during deflation;
   a flexible piezoelectric sensor coupled to the flexible cuff and laterally positioned entirely between a lower edge of the bladder and a lower edge of the cuff, the flexible piezoelectric sensor defining an elongated strip that extends along the flexible cuff and is configured to conform to and at least partially encircle the limb of the user when the flexible cuff is wrapped around the limb of the user, the flexible piezoelectric sensor operative to:
      detect blood flow through the limb of the user during the inflation, the deflation or both; and
      output a signal indicative of the detected blood flow during the inflation, the deflation or both; and
   a processor coupled with the piezoelectric sensor and operative to:
      filter the signal to isolate sounds corresponding to changes in the blood flow through the limb due to the inflation of the bladder, the deflation of the bladder or both;

correlate the isolated sounds with a pressure inside the bladder; and determine a blood pressure of the user at least partially based on correlating the isolated sounds with the pressure.

2. The blood pressure measurement device of claim 1, further comprising a pressure sensor, wherein:
the signal is a first signal;
the pressure sensor is operative to measure the pressure inside the bladder and output a second signal indicating the pressure to the processor;
the flexible cuff comprises an upper edge;
the bladder is positioned between the upper edge and the piezoelectric sensor;
the flexible piezoelectric sensor is positioned between the flexible cuff and the limb; and
filtering the first signal to isolate the sounds comprises identifying:
a first sound indicative of restriction of the blood flow due to partial collapse of a blood vessel within the limb; and
a second sound indicative of stoppage of the blood flow in the blood vessel.

3. The blood pressure measurement device of claim 1, wherein filtering the signal comprises:
applying a first band pass filter having a first frequency range to the signal;
applying a second band pass filter having a second frequency range to the signal; and
the first frequency range comprises higher frequency components of the signal than the second frequency range.

4. The blood pressure measurement device of claim 3, wherein:
the first frequency range comprises frequency components that correspond to the sounds resulting due to the changes in the blood flow.

5. The blood pressure measurement device of claim 1, further comprising a pump operative to inflate the bladder, wherein:
the flexible piezoelectric sensor is operative to detect changes in sounds corresponding to blood flow within a frequency range; and
the pump operates at a frequency that is greater than the frequency range.

6. The blood pressure measurement device of claim 5, wherein the pump is an ultrasonic pump.

7. The blood pressure measurement device of claim 1, wherein the flexible piezoelectric sensor is operative to wrap around an entirety of the limb.

8. The blood pressure measurement device of claim 1, wherein the flexible piezoelectric sensor is a differential piezoelectric sensor.

9. The blood pressure measurement device of claim 1, wherein the flexible piezoelectric sensor is positioned within an interior portion of the cuff.

10. A blood pressure measurement device, comprising:
A flexible cuff operative to wrap around a limb of a user;
a bladder coupled to the flexible cuff and configured to be secured to the limb of the user by the flexible cuff, the bladder operative to compress the limb of the user during inflation and decompress the limb during deflation;
a flexible piezoelectric sensor coupled to the flexible cuff and laterally positioned entirely between a lower edge of the bladder and a lower edge of the cuff, the flexible piezoelectric sensor defining an elongated strip that extends along the flexible cuff, is positioned between the bladder and a lower edge of the flexible cuff and is configured to conform to and at least partially encircle the to the limb of the user when the flexible cuff is wrapped around the limb of the user, the elongated the flexible piezoelectric sensor operative to detect blood flow through the limb of a user; and
a processor operative to:
receive a signal from the flexible piezoelectric sensor that is indicative of the blood flow through the limb during the inflation, the deflation or both; and
filter the signal to:
identify a first sound that corresponds to a change in the blood flow due to a partial collapse of a blood vessel within the limb during the inflation, the deflation or both; and
identify a second sound that corresponds to a stoppage of the blood flow in the blood vessel within the limb during the inflation, the deflation or both; and
determine a blood pressure of the user at least partially based on the identified first and second sounds.

11. The blood pressure measurement device of claim 10, wherein the flexible piezoelectric sensor is contained within the flexible cuff.

12. The blood pressure measurement device of claim 10, wherein:
the bladder is contained within a proximal portion of the flexible cuff;
the flexible piezoelectric sensor is contained within a distal portion of the flexible cuff; and
the flexible piezoelectric sensor is separated from the bladder by a dampening material that is operative to isolate the piezoelectric sensor from pressure oscillations within the bladder.

13. The blood pressure measurement device of claim 10, wherein:
the signal is a first signal; and
the blood pressure measurement device, further comprises:
a pump coupled to the bladder and operative to inflate the bladder; and
a pressure sensor coupled to the bladder and operative to output a second signal indicative of a pressure within the bladder.

14. The blood pressure measurement device of claim 13, wherein the processor is operative to:
receive the second signal from the pressure sensor;
determine a first pressure within the flexible cuff that corresponds to identifying the first sound; and
determine a second pressure within the flexible cuff that corresponds to identifying the second sound.

15. The blood pressure measurement device of claim 10, wherein the processor is operative to determine the blood pressure of the user from signals corresponding to inflation of the bladder.

16. A method for measuring blood pressure of a user, the method comprising:
inflating a bladder of a flexible cuff to increase a pressure within the bladder to compress a blood vessel of the user;
detecting, using a flexible piezoelectric sensor, changes in blood flow through the blood vessel during the inflating of the bladder, the changes corresponding to collapse of the blood vessel, the flexible piezoelectric sensor comprising an elongated strip extending along the flexible cuff, laterally positioned entirely between a lower edge of the bladder and a lower edge of the flexible cuff and configured to conform around the limb of the user when the cuff is wrapped around the limb of the user;

outputting a first signal indicative of the changes in the blood flow during the inflating of the bladder;

detecting, using a pressure sensors, the pressure within the bladder during the inflating of the bladder;

outputting a second signal indicative of the pressure during the inflating of the bladder; and filtering the first signal to:
  identify a first sound that corresponds to a change in blood flow through the blood vessel due to partial collapse of the blood vessel; and
  identify a second sound that corresponds to a stoppage of blood flow in the blood vessel;

operating a processor to:
  receive the first and second signals;
  determine, using the first and second signals, a first pressure in the bladder corresponding to an occurrence of the first sound;
  determine, using the first and second signals, a second pressure in the bladder corresponding to an occurrence of the second sound; and
  estimate a blood pressure of the user using the first pressure and the second pressure.

17. The method of claim 16, wherein filtering the first signal comprises:
  using a first band pass filter to isolate portions of the first signal falling within a first frequency band corresponding to changes in sound of the blood flow; and
  using a second band pass filter to isolate portions of the first signal falling within a second frequency band corresponding to changes in the pressure within the bladder.

18. The method of claim 17, wherein:
  the portions of the first signal falling within the first frequency band are used to determine systolic and diastolic blood pressure of the user; and
  the portions of the first signal falling within the second frequency band are used to determine a mean blood pressure of the user.

19. The method of claim 16, wherein inflating the bladder comprises inflating the bladder until the second sound is identified.

* * * * *